United States Patent [19]

Rydborn

[11] Patent Number: 5,329,218

[45] Date of Patent: Jul. 12, 1994

[54] METHOD OF CHARGING A BATTERY

[76] Inventor: Sten Å. O. Rydborn, Klöxhultsvägen 21, S-34300 Älmhult, Sweden

[21] Appl. No.: 952,828
[22] PCT Filed: May 24, 1991
[86] PCT No.: PCT/SE91/00368
 § 371 Date: Nov. 30, 1992
 § 102(e) Date: Nov. 30, 1992
[87] PCT Pub. No.: WO91/19343
 PCT Pub. Date: Dec. 12, 1991

[30] Foreign Application Priority Data

May 28, 1990 [SE] Sweden ............................ 9001900-1

[51] Int. Cl.$^5$ ............................................. H02J 7/10
[52] U.S. Cl. ............................................. 320/21; 320/32
[58] Field of Search ................................. 320/21, 32

[56] References Cited

U.S. PATENT DOCUMENTS 3,987,353 10/1976 Macharg ................. 320/39
4,396,880 8/1983 Windebank ............. 320/21
4,549,127 10/1985 Taylor et al. ............ 320/21
4,745,349 5/1988 Palanisamy et al. ..... 320/22

Primary Examiner—R. J. Hickey
Attorney, Agent, or Firm—Antonelli, Terry, Stout & Kraus

[57] ABSTRACT

A method of regulating the charging of batteries containing a number of cells, for example NiCd cells. The battery is connected to a battery charger for impressing a current through the battery for charging thereof. Prior to the actual impression of current through the battery cells for raising their terminal voltage, the voltage drop caused by cables, connections, the inner resistances of the battery caused by the battery cells, etc., is established for a number of different brief current pulses. The value of the voltage drop established for each current pulse is stored in a memory, and currents of substantially the same magnitude as each respective current pulse are impressed successively through the battery, each one of a length of time such that the voltage measured across the battery corresponds to the maximum permitted terminal voltage of the battery, plus the voltage drop established and stored for the corresponding current pulse.

3 Claims, 1 Drawing Sheet

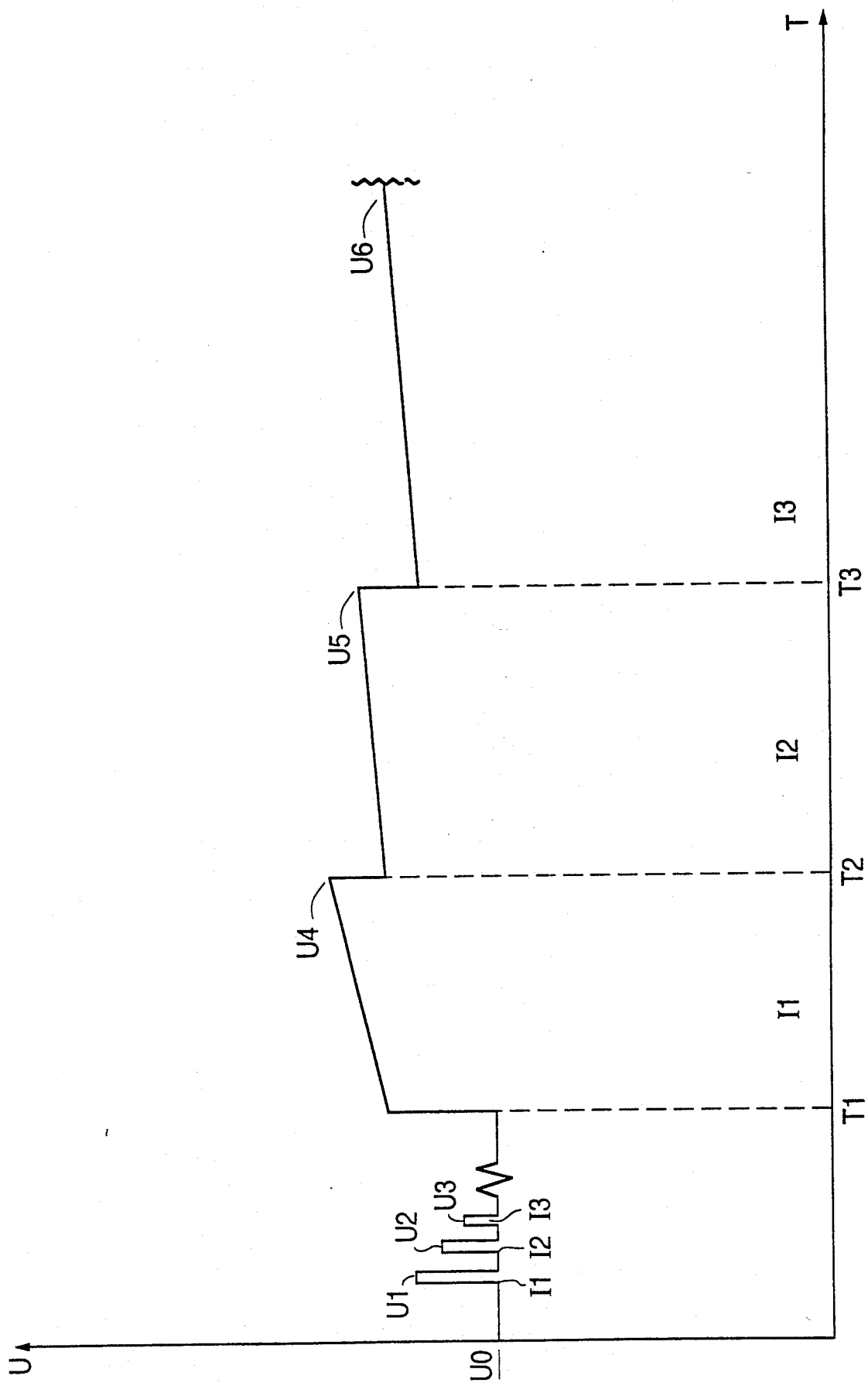

METHOD OF CHARGING A BATTERY

BACKGROUND OF THE INVENTION

The present invention relates to a method of regulating the charging of batteries containing a number of cells, for example NiCd cells, in which the battery is connected to a battery charger for impressing a current through the battery.

A plurality of different techniques for charging batteries containing, for example, NiCd cells are known in the art. Examples are constant current charging, constant voltage charging in which the charging current is based on the battery cell temperature and pressure, pressure and temperature charging, and pulse charging. The major advantage afforded by constant current charging is that the charger may be of extremely simple design, while its major drawbacks are those of being restricted to a temperature range of between 0° and 40° C. and of requiring an extremely long charging time at lower temperatures, since the permitted mean current under cold conditions is considerably lower than at room temperature. Furthermore, the charging itself takes place completely uncontrolled and without any adaptation whatever to the capacity of the cells to accept the charging energy. Constant voltage charging is also uncontrolled, but in this process the properties of the cell are utilized somewhat better. However, in this case also the charging time will be long, in particular at low temperatures. Because of the difficulties in providing pressure and temperature-sensing elements, pressure and temperature charging occurs only in extremely special and uncommon circumstances. In this case, the reason for this is that the practical obstacles are as good as insurmountable. In per se conventional pulse charging, the charging takes place in cycles of, for example, 1 Hz, the charging current being, for example, twice as great as the nominal discharging current. Pulse charging has proved to be more efficient than many other charging techniques, in particular at low temperatures. In conventional pulse charging, compensation is merely effected of poor control of the charging current of the battery. However, conventional pulse charging involves considerable charging time and relatively poor control over the different parameters.

SUMMARY OF THE INVENTION

The object of the basis of the present invention is to provide a novel method of regulating the charging of a battery containing a number of cells, for example NiCd cells, this method providing a complete charging of the battery in a considerably shorter time than has hitherto been possible both at room temperature and particularly at low temperatures.

The primary advantage of the method according to the present invention resides in the possibility of a complete charging of a battery in a considerably shorter time than has hitherto been possible, without any risk whatever of undesired pressure elevation in the individual cells arising from gas formation. While a charger for carrying out the method according to the present invention may appear to be relatively complex, its degree of complexity is undoubtedly the result of the extraordinary advantages afforded by the charger, which gives as good as 50% shorter charging times, and in many cases even shorter, than prior art chargers, this without any risk whatever of undesired gas formation in the cells. In addition, the method according to the present invention makes it possible to take into account the capacity of the individual cells to receive charging energy, whereby all cells in a battery will be given substantially the same charging level irrespective of whether any of the cells becomes fully charged before any of the others. In addition, the method according to the present invention has proved to permit charging of batteries at such low temperatures as −20° C.

BRIEF DESCRIPTION OF THE DRAWINGS

One embodiment of the present invention will be described an greater detail hereinbelow, with particular reference to the accompanying drawing which shows a schematic cycle (not to scale) in diagram form for illustrating one embodiment of the method according to the present invention.

DETAILED DESCRIPTION OF A PREFERRED EMBODIMENT

In the following description, the expression rest voltage" signifies the voltage measured at a given timepoint across the connection terminals of a battery, when no current flows to or from the battery. The expression "terminal voltage" signifies the voltage measured at a given timepoint across the connection terminals of the battery, when current is flowing to or from the battery. A further expression which is common in conjunction with batteries and charging of batteries is "EMF" by which is taken to signifies the rest voltage after a relatively long rest period of more than 10 minutes, when no current flows to or from the battery. This is also considered as a stable state for the battery.

A battery which is to be charged according to the present invention may comprise, for example, ten NiCd cells, each of 1.2 V, which are connected in series to form a 12 V battery. A NiCd cell has a so-called critical voltage of 1.52–1.55 V at room temperature. At or above this critical voltage, there is a risk of gas formation in the cell, and this critical voltage is established by purely chemical means. However, the value should not be considered as absolute, since it varies somewhat with the ambient temperature and, thereby, the temperature in the cell proper.

According to the present invention, a method for regulating the charging of the battery (or quite simply for carrying out charging of the battery) entails, as illustrated more closely in the drawing, impressing a number of relatively short current pules 11, 12 and 13 through the battery. The value of the terminal voltage U1, U2 and U3, respectively, achieved on each current pulse I1, I2, I3 is measured, and the rest voltage U0 of the battery is subtracted from the result, the obtained difference being substantially equal to that voltage drop which occurs in total throughout the entire chain - cables, terminals, inner resistances of the battery, and so on - at the different values of the current pulses I1, I2 and I3. The value corresponding to the obtained voltage drop is stored in a suitable memory circuit, whereby there will be access to a direct value of the voltage drop occurring at each current value. Naturally, the whole voltage value U1, U2, U3, respectively, can be stored instead of merely the difference between the above-mentioned voltage value and the rest voltage of the battery, whereafter the difference is calculated later.

There is, of course, nothing to prevent the employment of more current pulses than the number of current pulses to depicted in the drawing, as intimated by a variation of the rest voltage level.

As has been mentioned, the drawing shows the voltage along the vertical axis and the time along the horizontal axis, the curve showing those voltage values which are attained at the different currents.

With the NiCd cells mentioned in the foregoing, the maximum permitted terminal voltage of the battery without risk of gas formation in the cells will amount to 15.2–15.5 V. If the voltage drop at the current pulse I1 is 3 V, the battery can be impressed with a current I1 of the same value as the current pulse I1 at the time T1, and the current I1 is allowed to flow through the battery until the time T2, when the terminal voltage has reached the value U4, which corresponds to the maximum permitted terminal voltage plus the voltage drop measured at the short current pulse I1. At the time T2, when the maximum permitted terminal voltage has been reached, the current is reduced to I2, whose value corresponds to the value of the short current pulse I2. This charging current I2 is maintained until the terminal voltage of the battery reaches the value U5, which corresponds to the maximum permitted terminal voltage with the addition of the voltage drop established by the current pulse I2. At the time T3, the current I2 is reduced to the current I3, whereupon the current I3 is impressed through the battery until the maximum permitted terminal voltage plus the voltage drop at the short current pulse I3 is reached and corresponds to the terminal voltage U6.

This cycle is repeated, perhaps several times, until the battery is fully charged. A criterion hereof may be that the value of the currents in I1, I2 and I3 once again increase instead of successively decreasing.

After the voltages U1, U2 and U3 have been established and the corresponding voltage drops calculated once for a battery, this phase need not, as a rule, be repeated, but the established voltage drop values can, as mentioned previously, be stored and retrieved for each individual battery type.

The charging cycle proper, or the method of charging, is largely a question of programming an apparatus according to Applicant's earlier U.S. patent application Ser. No. 07/768,656 filed Oct. 11, 1991, a suitable apparatus being illustrated therein in FIG. 4.

I claim:

1. A method of charging a battery containing a number of cells, comprising connecting a battery to a battery charger; passing a plurality of brief current pulses through the battery; measuring the voltage drop due to cables, terminals, and the inner resistances of the battery formed by the battery cells, during the plurality of brief current pulses; storing the value of the measured voltage drop established for each one of the current pulses in a memory; and passing currents of substantially the same magnitude as each respective current pulse successively through the battery, each one of said last-named currents continuing for a length of time such that the voltage measured across the battery corresponds to the maximum permitted terminal voltage of the battery plus the established and stored voltage drop for the corresponding current pulse.

2. The method as claimed in claim 1, wherein the magnitude of the current pulses is successively reduced, and thereby also the magnitude of the corresponding currents which are impressed through the battery for raising its terminal voltage is successively reduced.

3. The method as claimed in any of claims 1 and 2, further comprising monitoring the current required for achieving said maximum permitted terminal voltage; and discontinuing the currents through the battery when the monitored current increases instead of successively decreasing.

* * * * *